United States Patent [19]

Rice

[11] Patent Number: 4,571,328
[45] Date of Patent: Feb. 18, 1986

[54] AQUEOUS HYDRIDES

[75] Inventor: G. Kenneth Rice, Sugarland, Tex.

[73] Assignee: Teknico Industries, Inc., Richmond, Tex.

[21] Appl. No.: 723,530

[22] Filed: Apr. 15, 1985

Related U.S. Application Data

[63] Continuation-in-part of Ser. No. 671,684, Nov. 15, 1984, abandoned, which is a continuation of Ser. No. 527,752, Aug. 30, 1983, abandoned.

[51] Int. Cl.$^4$ ............................................. C01G 23/00
[52] U.S. Cl. ...................................... 423/69; 423/89; 423/99; 423/111; 423/324
[58] Field of Search ................... 106/1.05, 1.22, 1.25, 106/1.27, 1.29; 423/327, 594, 644–647, 598, 600, 608, 618, 622, 624–625, 627, 629, 69, 89, 99, 111, 324–326; 204/116, 45.1, 55 R, 54 L

[56] References Cited

U.S. PATENT DOCUMENTS

| 3,493,401 | 2/1970 | Schutt et al. | 106/1.22 |
| 4,029,747 | 6/1977 | Merkl | 423/351 |
| 4,479,824 | 10/1984 | Schutt | 106/1.05 |

Primary Examiner—R. L. Andrews
Attorney, Agent, or Firm—E. F. Bard & Associates

[57] ABSTRACT

A coating comprising elemental silicon is electrodeposited on a substrate from an aqueous medium. The plating bath is a solution of what is described as one or more metal hydrides. The metal hydrides of the present invention are provided by combining stoichiometric amounts of metal, alkaline metal hydroxide and water in a preselected proportion by mole percent. The particular proportion is a function of the particular metal. A hydride concentrate is provided which is used in aqueous solution to provide a plating bath.

4 Claims, 20 Drawing Figures

AQUEOUS HYDRIDES

RELATED APPLICATIONS

This application is a continuation-in-part of my prior copending application Ser. No. 671,684, filed on Nov. 15, 1984, which is a continuation of my prior copending application Ser. No. 527,752, filed Aug. 30, 1983, both now abandoned.

BACKGROUND OF THE INVENTION

This invention relates to electrodeposition of silicon and other metals and to provision of hydride compounds useful in solution as aqueous electrodeposition baths.

Elemental silicon is useful as a coating in a number of different applications. Silicon is a highly effective, corrosion-resistant coating for metals. Silicon coating is used for absorption of incidence solar photons in the generation of electricity by photovoltaic means.

Prior art methods for electrolytic deposition of silicon are difficult and inconvenient in use in that they may require operation at high temperature or in a closed, inert atmosphere. For example, one such method is disclosed in G. Boe, K. Grjotheim, K. Matiasovsky and P. Felner, *Electrolytic Deposition of Silicon and of Silicon Alloys,* Canadian Metallurigical Quaterly, Volume 10, No. 4 (1971), pp. 281-285. In that method, silica ($SiO_2$) and alumina ($Al_2O_3$), were dissolved in cryolite, $3Na^F AlF_3$. The metal is held at approximately 1030° C. and subjected to electrolysis. A copper cathode was utilized and at selected current densities, only silicon was deposited at the cathode. Operation at high temperature using molten materials is required.

Another method for electrolytic deposition of silicon is disclosed in U.S. Pat. No. 3,990,953 to Alfred E. Austin, issued on Nov. 9, 1976. In that method, elemental silicon is deposited on a cathode. A non-aqueous electroplating composition is provided consisting essentially of a non-aqueous solvent solution of anhydrous liquid aprotic dipolar organic solvent such as propylene carbonate containing a silicon solute, such as silicon tetrachloride or trichlorosilane. Deposition on the cathode body is provided through electrolytic reduction of a silicon halide or haloid silane compound. In this method, a non-aqueous electroplating composition must be provided, and the reation is conducted in a sealed vessel in which inert gas must fill the space over the non-aqueous liquid. While operation at relatively low temperatures, e.g. 20°-100° C., is provided, operation in a sealed atmosphere is required.

The present invention comprehends combining silicon in an aqueous solution to provide a plating bath comprising a source of silicon, or by using the same principles to provide a plating bath providing a source of other metals. These compounds will be referred to as hydrides. While there structure is not completely understood at the present time, they do provide the desired electroplating bath. Therefore, the efficacy of the teachings herein should in no way be considered to be affected should reactive species eventually be determined to be other than as described or should a principle be less than fully understood. A repeatable process is provided and explained as fully as possible at the present time.

It is generally believed that provision of a hydride compound suitable as a plating substrate, for example, is impossible to provide. For example, see Douglas M. Considine, Editor, *Chemical and Process Technology Encyclopedia* (McGraw-Hill, Inc.; New York, N.Y.; 1974), under the description of silicon at page 1031. In describing the chemical properties of silicon, it is stated that "even with diluted bases, Si reacts vigorously, developing $H_2$ and forming alkali silicates." Silicon hydride is also unexpected in the aqueous form. The entry also states that $SiH_4$ and the chlorosilanes are instantaneously hydrolyzed with a nucleophilic agent, such as $OH^-$ (water and bases). Silicates do not have utility as a source of metal in an aqueous plating bath. For example, see Ralph K. Iler, *The Chemistry of Silica,* (John Wiley & Sons; New York, N.Y.; 1979). At page 123, the section entitled "The Nature of Silicate Solutions" discloses a plurality of equilibria between forms of silicate in aqueous solution. None are recognizable as sources of elemental silicon in a plating bath.

SUMMARY OF THE INVENTION

It is therefore an object of the present invention to provide a method for electrodeposition of silicon on a cathode from an aqueous medium.

It is a further object of the present invention to provide electrodeposition from an aqueous medium of other metals as well.

It is a further object of the present invention to provide the methods of the type described in which such methods may be performed conveniently in terms of provision of components and temperature and atmosphere constraints.

It is an additional object of the present invention to provide metal hydride compounds having utility in the electrodeposition method.

It is a particular object of the present invention to provide a silicon hydride.

It is an additional specific object of the present invention to provide a solution comprising a silicon hydride for use as a plating bath.

Briefly stated, in accordance with the present invention there is provided a method in which metal such as silicon is deposited on a substrate from an aqueous solution of a hydride compound. The hydride compound is prepared from a combination of stoichiometric amounts of silicon or other metal reacted with an alkaline metal hydroxide in water. The stoichiometric amounts require a particular ratio by mole percent which ratio is a function of the particular metal to be used.

In one form, a silicon hydride compound is formed by the combination of silicon, sodium hydroxide, and water in the ratio of 6:1:10 respectively by mole percent.

In a further preferred embodiment, the hydride is combined with water to provide a plating bath.

In another embodiment, a method for electrodeposition of metal on an electrically conductive cathode member comprises placing the member in the above-described plating bath and passing an electroplating current therethrough.

The invention, both as to its organization and manner of operation is pointed out particularity in the claims forming the concluding portion of the specification. The invention may be further understood by reference to the following detailed description.

These and other features, objects and advantages of the present invention will become apparent from the following detailed description, wherein reference is made to the figures in the accompanying drawings.

DESCRIPTION OF PREFERRED EMBODIMENTS AND DETAILED DESCRIPTION OF DRAWINGS

It has been found that by reacting certain non-alkaline metals in an aqueous medium with an alkaline hydroxide, stable metal hydride solutions can be produced. It should be noted that the precise reactive species in the reactions referred to below have not been completely defined. The term hydride as used herein means a compound produced by the below-described reactions. The term hydride is used for reactive species in the reactions or irrespective of the particular molecular structure of these compounds and is a descriptive device. Most significant of the metals which it is desired to form hydride of is silicon. Providing the hydride compound will provide for the ability to electroplate silicon from an aqueous solution. Use of the below-described examples has confirmed efficacy by confirming the presence of silicon in coatings formed on a cathode under KEVEX electron microscopic analysis.

According to the present invention, a metal hydride is formed by reacting a non-alkaline metal with an alkaline metal hydroxide in water. This reaction produces a hydride. The hydride is also referred to herein as a hydride compound. This compound will be stable and useful in electroplating. The compound is water soluble and may be diluted to provide an aqueous solution. Finally, in accordance with the present invention, the aqueous solution is prepared as a plating bath, and electroplating onto a cathode is performed utilizing the solution as a plating bath.

In order to form the hydride, the metal, hydroxide and water must be provided in specific proportions. It has been found that provision of components in proportions in accordance with the present invention will provide for a useful hydride, plating bath solution, and plating method as described above. Departures from the proper proportions (or from proper conditions as described below) will result in provision of a mass that is useless within the context of the present description. The proper amount of each component is referred to herein as an effective amount. By following the teachings herein, one skilled in the art will be able to determine where he has utilized an effective amount. Qualitative tests will be indicative of an effective amount as well as the provision of components in the proper stoichiometric relationships. For example, in the case of a silicon hydride, when components are provided in an effective amount, the resulting hydride will have a darkish grey color when prepared from low purity silicon and a substantially colorless appearance when prepared from high purity silicon. If the compound produced from the low purity silicon has a warm, irridescent, mercury-like appearance, then the practitioner has in all probability produced undesired silicate rather than the desired hydride. An effective amount is also known to be provided if the resulting compound is useful for electroplating.

The following have been found to be ratios of effective amounts by mole percent. In each case, the molecular weight of the component is calculated and that weight, or that weight multiplied by a constant, my be multiplied by the ratio number in the following list to provide a proper proportion.

|  | Metal | Sodium or Potassium Hydroxide | $H_2O$ |
| --- | --- | --- | --- |
| Silicon | 6 | 1 | 10 |
| Aluminum | 2 | 1 | 8 |
| Beryllium | 2 | 1 | 6 |
| Titanium | 5 | 1 | 10 |
| Zinc | 1 | 1 | 6 |
| Tin | 5 | 1 | 10 |

Relative amounts should be measured carefully. To the extent imprecision must be accommodated, it should be noted that having an excess of metal is less likely to adversely affect the reaction than an excess of water or aqueous hydroxide. In a further embodiment (see Example XII) it is desired to provide excess metal.

The reaction rate should be kept controllable. This will be further defined below. In an uncontrollable reaction, the water is too rapidly dessicated. In the silicon example, silicate is likely to be formed when too much water is present or when too much water is removed. The reaction will vary depending on the metal and its form. For example, elemental silicon will react violently with base solutions. The temperature in exothermic reactions needs to be controlled. On the other hand, it may be necessary to add heat to make zinc react. In the case of exothermic reactions, the metal is added to the water and the hydroxide is added gradually over a period of time. It may be added in the form of pellets rather than powder to further control the rate at which heat is generated. In the example of silicon, it has been found that low purity silicon (95-98%) is more highly reactive. High purity silicon tends to react more slowly. In the case of exothermic reactions, it is desirable to provide cooling to keep the temperature in the range of 90°-110° C. to keep the reaction controllable. In the case of an endothermic reaction, heat may be added.

Time of reaction is not critical. However, the reaction should be permitted to continue until it has gone to completion.

EXAMPLE I

A silicon hydride product was prepared utilizing the following components in the following proportions:

|  | Gram Molecular Weight | Ratio | Arbitrary Constant | Total Grams Provided |
| --- | --- | --- | --- | --- |
| Si | 28 | 6 | 11 | 1848 |
| NaOH | 40 | 1 | 11 | 440 |
| $H_2O$ (in the form of $2(H_2O)_5$) | 18 | 10 | 11 | 1980 |

The artbirary constant 11 is simply a scale-up factor since it is desired to prepare more than the quantity provided by one mole of each component. The silicon metal was placed in a 6-liter reaction vessel and the water was added. Sodium hydroxide was added in the form of pellets slowly over a one-hour period. The reaction time from ambient to maximum temperature due to exothermic reaction and back was approximately six hours. The temperature reached was 110° C. The resulting product was very dense. The specific gravity was difficult to measure, and probably in the vicinity of 1.8–2.0.

EXAMPLE II

The product produced by Example I was diluted to specific gravity 1.3 with water. This solution of a hydride product comprised a plating bath.

EXAMPLE III

A zinc hydride solution was prepared in the following manner:

|  | Gram Molecular Weight | Ratio | Arbitrary Constant | Total Grams Provided |
|---|---|---|---|---|
| Zn | 65 | 1 | 6 | 390 |
| NaOH | 40 | 1 | 6 | 240 |
| $H_2O$ (in the form of $2(H_2O)_5$) | 18 | 6 | 6 | 648 |

The zinc was placed in a 2-liter flask, and the water was added. Zinc flakes were utilized. Sodium hydroxide was added over a one-hour period. Heat was added to the reaction since zinc is less reactive in an alkaline medium than silicon. The reaction temperature averaged 80° C. The reaction was continued for 48 hours. At the end of 48 hours, the solution should contain about 2% zinc. This hydride compound may be used for plating.

EXAMPLE IV

Components were provided as in Example I. However, the silicon was provided in the form high purity zone refined chunks 1.5–2" in diameter. The silicon was placed in a 6-liter flask and water added. Ice was used to cool the reaction. Sodium hydroxide was added incrementally over a one-hour period. Reaction temperature was held to approximately 25° C. Cooling was then removed and the reaction allowed to proceed unaided. The reaction started to become exothermic approximately four hours later and more highly exothermic another two hours thereafter. After a further hour, the reaction slowed down. The solution appeared to be relatively dense. The reaction terminated six hours after it began. A solution was produced which was clear and colorless having a specific gravity of approximately 1.5.

EXAMPLE V

A silicon solution was provided using potassium hydroxide:

|  | Gram Molecular Weight | Ratio | Arbitrary Constant | Total Grams Provided |
|---|---|---|---|---|
| Si | 28 | 6 | 8 | 1334 |
| KOH | 56 | 1 | 8 | 448 |
| $H_2O$ (in the form of $2(H_2O)_5$) | 18 | 10 | 8 | 1440 |

Again, the silicon was placed in a reaction vessel and water added. Potassium hydroxide was added over the period of an hour. The reaction went from room temperature to maximum temperature and back in about five hours. The temperature peak reached was 105° C. The reaction rate of the silicon slowly decreases after the reaction reaches peak temperature and as the density of the product increases.

EXAMPLE VI

|  | Gram Molecular Weight | Ratio | Arbitrary Constant | Total Grams Provided |
|---|---|---|---|---|
| Al | 27 | 2 | 6 | 324 |
| NaOh | 40 | 1 | 6 | 240 |
| $H_2P$ (in the form of $2(H_xO)_4$) | 18 | 8 | 6 | 864 |

$H_2O$ was added to the aluminum in a 2-liter flask. Sodium hydroxide pellets were added. As the pellet addition was completed, the reaction became violently exothermic, releasing water vapor. The reaction started slowing down by itself approximately 45 minutes later.

EXAMPLE VII

|  | Gram Molecular Weight | Ratio | Arbitrary Constant | Total Grams Provided |
|---|---|---|---|---|
| Sn | 119 | 5 | 2 | 1190 |
| NaOH | 40 | 1 | 2 | 380 |
| $H_2O$ | 18 | 10 | 2 | 360 |

The tin reaction is similar to that for zinc in that heat must be applied to maintain a good reaction rate. The reaction time is 48 hours. The reaction time may be increased depending on the percent of tin in solution which is necessary.

EXAMPLE VIII

A combination of hydride compounds from Example II and Example III were used to prepare a plating bath. 100 ml of the solution of Example II were combined with 100 ml of water and 100 ml of the solution of Example III. A electroplating bath was provided with a zinc anode and a carbon steel bolt comprising the cathode. The bolt was cleaned in a 25% HCl solution for approximately 15 minutes and then rinsed with water prior to its connection as a cathode. The silicon hydride solution was mixed with water and then the zinc hydride solution was added. This solution formed the electroplating bath. A current of 1 amp was applied to the bath for five minutes.

EXAMPLE IX

A plating bath was provided utilizing 100 cc of solution according to Example IV, 100 cc of water and 25 cc of solution according to Example III. These were combined to form an electrolyte. A zinc anode and a copper cathode were connected in the plating bath and plating conductor. It was found that heating the electrolyte reduces resistance dramatically and plating is more efficient. The dilution rates will also effect the rate of plating.

It should be noted that viscosity of the electrolyte effects conductivity. The conductivity increases with dilution or by applying heat.

EXAMPLE X

A plating bath was prepared utilizing 100 ml of solution prepared by Example I, 100 ml of water and 100 ml of hydride according to Example III. The three liquids were combined to comprise a plating bath. A brass cathode and tin anode were provided. The brass was prepared by cleaning with brass cleaner. A plating current of one amp at three volts was applied for approximately one minute.

EXAMPLE XI

A plating bath was provided utilizing a nickel solution combined in equal amounts with water. Two nickel anodes were used for better coverage on the substrate and a steel cathode was provided. One amp was applied at five volts for one-half hour.

EXAMPLE XII

A hydride comprising two metals has also been produced. In this example, the following components were provided:

|  | Gram Molecular Weight | Ratio | Arbitrary Constant | Total Grams Provided |
| --- | --- | --- | --- | --- |
| Si | 28 | 6 | 11 | |
| Zn | 65 | 1 | 11 | |
| NaOH | 40 | 1 | 11 | |
| $H_2O$ (in the form of $2(H_2O)_5$) | 18 | 10 | 11 | 1980 |

The silicon and zinc metal were placed in a reaction vessel and water was added. Sodium hydroxide was added over a one-hour period. The reaction continued for eight hours. The resulting compound was removed and filtered. The compound provided a concentrate for an electroplating bath.

In this example, the effective amounts for a silicon compound are utilized, and excess zinc is provided. The resulting hydride will be partially zinc and partially silicon hydride.

EXAMPLE XIII

A hydride has also been produced utilizing an acid. In this example, nickel was utilized as the metal:

|  | Gram Molecular Weight | Ratio | Arbitrary Constant | Total Grams Provided |
| --- | --- | --- | --- | --- |
| Ni | 59 | 5 | 3 | 885 |
| NaOH | 40 | 1 | 3 | 120 |
| $H_3PO_4$ | 98 | 3 | 3 | 882 |

The $H_3PO_4$ is provided at a specific gravity of 1.689. Therefore 522 ml of phosphoric acid are needed. Also, 882 grams of water are combined with the phosphoric acid.

The nickel is placed in a 2-liter flask and the phosphoric acid solution is added. The sodium hydroxide is combined slowly, and heat is applied. The temperature is maintained at about 85° C.

As discussed above, each of the hydrides may be used as a plating bath, may be dissolved in water as a plating bath and may be combined with other hydrides in solution. Depending on thickness, time and other factors, temperature or dilution may be varied. Plating will not take place if an ineffective amount of component is provided since a hydride bath will not be present. The provision of plating will be readily apparent so that one skilled in the art will know if indeed, he has achieved the proper proportions in producing the desired hydride baths. The specification has been written with a view toward enabling those skilled in the art to make many modifications to the specific exemplifications illustrated herein to provide hydrides, plating baths, and plating methods in accordance with the present invention.

From experimental work, it seems apparent that by reacting certain metals (nonalkaline) with other (alkaline) metals it is possible to produce stable metal hydrides. This is accomplished by taking a nonalkaline metal, e.g., silicon, and reacting it with an alkaline metal hydroxide, e.g., NaOH or KOH in the presence of $H_2O$.

The Si metal reacts with the aqueous hydroxide. The reaction proceeds from ambient to an extremely exothermic one.

During the reaction the hydrogen taken from the OH groups that are present bonds with the Si forming SiH groups.

This reaction takes place without external aid.

It is important to note that the amounts of the components can be critical for the reaction mentioned above.

By using Si as a metal in the reaction and forming a stable aqueous metal hydride, it is possible to electroplate the Si from solution onto a substrate.

By using this method, multi-metal hydrides can also be produced.

Reactions using less reactive metals, i.e., Zn, Sn, Cu, etc., are accomplished by applying heat to the reaction.

EXAMPLE XIV

Preparation of Si Solution (Product):
$SiNaOH2(H_2O)_5$
28, 40, 180
(28) 11=308×6=1848 g Si
(40) 11=440 g NaOH
(180) 11=1980 g $H_2O$ Si metal placed in reaction vessel, 6-liter capacity.

$H_2O$ added; then the NaOH pellets. The alkaline was added over a one (1) hour period.

Reaction time from ambient to exotherm was approximately six (6) hours. Temperature peak was 110° C.

Product was very dense. S.G. difficult to measure. Probably 1.8–2.0.

Diluted to S.G. 1.3 with $H_2O$.

This solution to be used for electroplating.

The amounts of the components used in the above produce the desired product.

EXAMPLE XV

Bi Metallic Hydride Liquid:
$SiZnNaOH2(H_2O)_5$
28, 65, 40, 180
(28) 11=308×6=1848 g Si
(65) 11=715 g Zn
(40) 11=440 g NaOH pellets
(180) 11=1980 g $H_2O$ The Si and Zn metal is placed into the reaction vessel. $H_2O$ added.

Then the NaOH over a one (1) hour period.

The reaction time is a little longer than with only Si. Duration eight (8) hours.

Product removed and filtered; will be diluted for electroplating.

EXAMPLE XVI

Preparation of Zn Solution:
$SiNaOH2(H_2O)_3$
65, 40, 108
(65) 6=390 g Zn (Flake)
(40) 6=240 g NNOH
(108) 6=648 g $H_2O$ Zn placed into a 2-liter flask.
$H_2O$ added.
NaOH added over a one (1) hour period.

Zn is less reactive in alkaline medium than Si; therefore, heat must be applied to the reaction.
Reaction temperature average 80° C.
Reaction time: forty-eight (48) hours straight.
After this time, the solution should contain about two percent (2%) Zn.
This solution to be used for plating.

EXAMPLE XVII

Si Solution:
$SiNaOH2(H_2O)_5$
28, 40, 180
(28) 11=308×6=1848 g Si
(40) 11=440 g NaOH
(180) 11=1980 g $H_2O$ High purity Si used (Zone Refined).
1.5 to 2 inches in diameter.
Si placed in a 6-liter flask, $H_2O$ added. Time 10:30.
Ice bath used to cool reaction.
NaOH added incrementally over a period of one (1) hour. Reaction temperature approximately 25° C.
Cooling removed. Reaction allowed to proceed unaided.
17:00 reaction continuing overnight.
Reaction starting to become exothermic.
Time 13:00. Temperature increasing slowly.
15:00 reaction quite violent.
16:00 reaction slowing down, solution appears relatively dense. Reaction terminated at 16:30, S.G. 1.5.
Solution clear.

EXAMPLE XVIII

Preparation of Si Solution using KOH:
$SiKOH2(H_2O)_5$
28, 56, 180
(Si) 28×8=224×4=1344 g Si
(KOH) 56×8=448 g KOH pellets
($H_2O$) 180×8=1440 g $H_2O$ Si placed in reaction vessel.
$H_2O$ added.
KOH added over a period of one (1) hour.
Reaction goes from room temperature to exotherm in about five (5) hours.
Temperature peak 105° C.
Once the reaction reaches peak temperature the reaction rate of the Si metal will slowly decrease as the density of the product increases.

Figures 1, 2, 3:
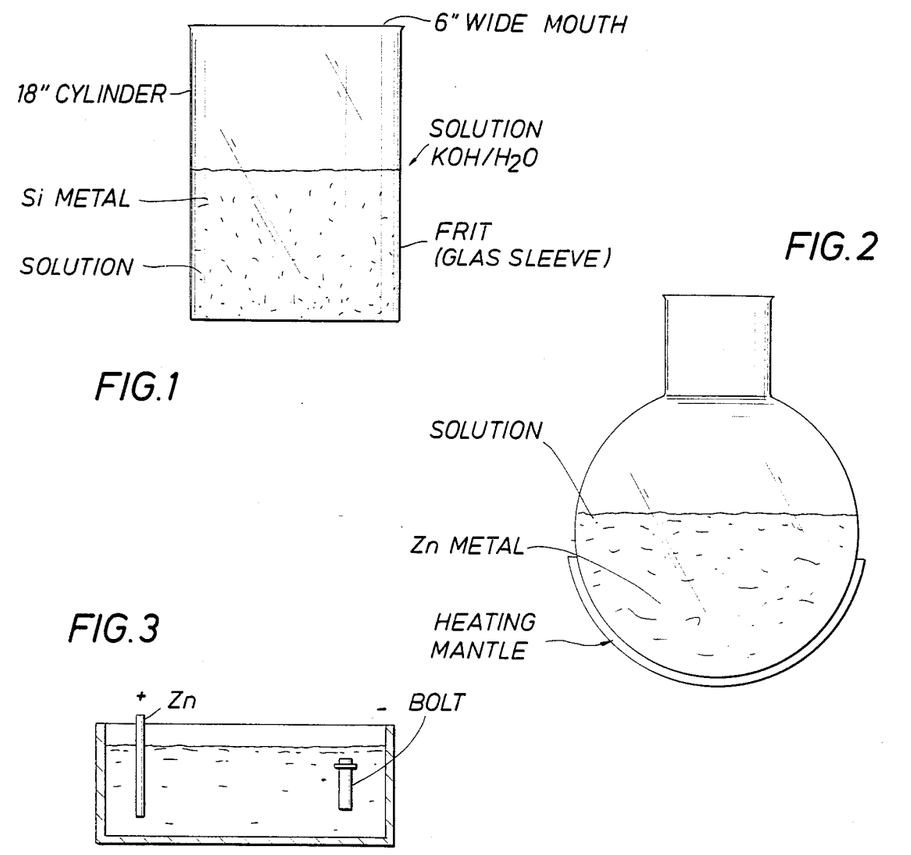
FIGS. 1-2 are pictorial representations of apparatus used to produce the solutions of the present invention.
FIGS. 3-5 are pictorial representations of electroplating apparatus used in accordance with the present inventions.

EXAMPLE XIX $SiKOH2(H_2O)_5$
(Si) 28×8=224×6=1344 g Si
(KOH) 56×8=448 g KOH ($H_2O$) 180×8=1440 g $H_2O$
Time Start: 13:00.
KOH added to $H_2O$ containing Si metal. See FIG. 1.

EXAMPLE XX

Preparation of Zn Solution:
$ZnNaOH2(H_2O)_3$
65, 40, 108
(65) 6=390 g Zn (Flake)
(40) 6=240 g NNOH
(108) 6=648 g $H_2O$ Zn placed into a 2-liter flask.
$H_2O$ added.
NaOH was added over a one (1) hour period.
Zn is less reactive in an alkaline medium than Si; therefore, heat must be applied to the reaction.
Reaction temperature average 80° C.
The reaction time was 48 hours. The solution contained about two percent zinc and is useful for plating.

EXAMPLE XXI

Si Solution Low Purity:
$SiNaOH2(H_2O)_5$
28, 40, 180
(28) 11=308×6−1878
(40) 11=440 g NaOH
(180) 11=1480 g $H_2O$ Low purity Si used, approximately ninety-five to ninety-eight percent (95-98%).
6-liter flask used, $H_2O$ added to Si metal in flask.
Cooling applied. NaOH feed started 10:00, NaOH feed complete at 11:30.
Temperature approximately 31° C., cooling removed.
Temperature of reaction slowly climbing.
16:00 reaction violent. Reaction terminated at 16:45.
Solution dense gray color.
Filtered and diluted to S.G. 1.5.
Solution greenish/gray.

EXAMPLE XXII

Zn Hydride Solution:
$ZnNaOH2(H_2O)_3$
65, 40, 108
(65) 6=390 g Zn
(40) 6=240 g NaOH
(108) 6=648 g $H_2O$ Zn High Purity (Flakes).
Cooling not used for Zn reaction due to Zn slow reactivity in alkaline.
11:00 NaOH added slowly over a period of one (1) hour. Temperature after addition approximately 80° C., Zn reacting slowly, but applied to maintain temperature (hot plate). Will let reaction continue for seventy-two (72) hours. See FIG. 2.

EXAMPLE XXIII

Al Solution:
$AlNaOH2(H_2O)_4$
27, 40, 144
(27) 6=162×2=324 g Al, 333.5 g. Actual
(40) 6=240 g NaOH
(144) 6=864 g $H_2O$ $H_2O$ added to Al in 2-liter flask.
NaOH pellets added.
11:00.
As the pellet addition was completed, the reaction went into a violent exotherm releasing $H_2O$ vapor. Let the reaction continue until it started slowing down by itself, which was approximately forty-five (45) minutes.

EXAMPLE XXIV

Ni Plating Solution Reaction:
$Ni[H_3PO_4]_3H_2O$
59, 294, 18
(59) 3 = 177×5 = 885 g Ni
(294) 3 = 882 g $H_3PO_4$/882 g $H_2O$
1.689 = 882/V = 522.2 ml.
The $H_3PO_4$ is = 85%

The $H_3PO_4$ is added; the 882 g $H_2O$ and mixed.

This solution is then added to the reaction vessel containing the Ni metal.

External heat is applied to aid the reaction rate.
Reaction temperature average is 80° C.
Forty (40) hours duration.

EXAMPLE XXV

Preparation of Sn Aqueous Hydride:
$SnNaOH2(H_2O)_5$
119, 40, 180
(119) 2 = 238×5 = 1190 g Sn
(40) 2 = 380 g $H_2O$
(180) 2 = 360 g $H_2O$ Sn metal placed into reaction vessel.
NaOH added after the $H_2O$.
Sn reaction is similar to the Zn inasmuch as heat must be applied in order to maintain a good reaction rate.
Reaction time: forty-eight (48) hours uninterrupted.
Note: The reaction time may be increased depending upon what percent of Sn in solution is necessary.

EXAMPLE XXVI

Preparation of Al Hydride Solution:
$AlNaOH2(H_2O)_4$
27, 40, 144
(27) 6 = 162×2 = 324 g Al
(40) 6 = 240 g NaOH
(144) 6 = 864 g $H_2O$ Al placed in reaction vessel.
NaOH added over one-half (0.5) hour period.
The Al reaction is much more violent than the Si. That is to say, the reaction rate of the Al is much greater.
Total reaction time: two (2) hours.
Note: Cooling the reaction may be required.

For electroplating, the Si solution is used as a base. The Zn, Sn, etc., solutions are then mixed with the Si solution.

The Si used in reaction can be either high or low purity. When using high purity, the initial amount of metal (Si) is greater.

The final product of the Si reaction is a very dense, high viscosity compound, gray in color (low purity), or transparent (high purity).

This compound is water soluble and may be diluted to suit a particular need.

During the exothermic phase of the reaction, the temperature will reach approximately 100°–120° C.

Excess Si should be provided. The molar ratios of Si to NaOH at the start of the reaction can be 6:1. This is to insure a proper reaction rate.

The finished product (Si) aqueous hydride solution will usually contain about twelve percent (12%) Si.

Taking the finished product and exposing it to direct heat will cause it to foam. (Solid.)

Upon further heating, the solid (foam) will return to a liquid 800°–1000° C., and thereupon, release a gas. (Hydrogen.)

EXAMPLE XXVII

Electroplating:
Substrate: Bolts (GM Automobile Fasteners)
Solutions: Si + Zn
100 ml. Si solution @1.3 S.G.
100 ml. $H_2O$
100 ml. Zn solution
Zn anode
Bolt cathode (carbon steel)
Si solution mixed with $H_2O$ then Zn solution added.
Electrolyte: Room temperature
Duration of electrolysis: five (5) minutes at one amp.
Preparation of substrate: Bolt cleaned in a twenty-five (25%) HCl solution for approximately fifteen (15) minutes, then rinsed with $H_2O$. See FIG. 3.

EXAMPLE XXVIII

Plating:
Using the H.P. Si solution along with the Zn solution:
100 cc. Si diluted with 100 cc. $H_2O$
25 cc. Zn solution
Zn anode, Cu cathode
Cold electrolyte At these dilutions the cathode is being plated; however, the resistance is high.

Heating the electrolyte brings the resistance down dramatically. Plating is more efficient. The dilution rates will also effect R. However, the plating, itself, works well.

Will proceed to find the rates of dilution that will enable to plate efficiently at ambient temperature.

Also, a comparison of the low purity Si solution will have to be made.

Zn Si Plating: High purity Si solution. A solution of one (1) part Si solution; one (1) part $H_2O$; and, one (1) part Zn solution. Plates efficiently at ambient temperature and pressure.

A ratio of one (1) part Si solution; two (2) parts $H_2O$; two (2) parts Zn solution also works well.

It would seem that the viscosity of the electrolyte affects the conductivity. Conductivity increases with dilution or by applying heat.

EXAMPLE XXIX

Electroless Plating:
Solution: One (1) part Si/Na solution (low purity)
One (1) part $H_2O$
One (1) part Zn Na solution
sample:
Cast Al fan blade
Fan blade painted
Paint removed using wire wheel blade then immersed in five percent (5%) HCl approximately five (5) minutes. Rinsed with $H_2O$.

Sample immersed in plating solution. Reaction between sample and solution occurs. Gas evolved from sample. (30 second duration.)

The Zn rod in the plating solution does not appear to react.

Zn deposited on sample.
Sample rinsed with $H_2O$. Towel dried.

Some of the deposit can be wiped off; however, most of it cannot; therefore, indicating surface preparation critical.

After second immersion of sample in plating solution, deposit cannot be wiped off.
Experiment:
Sample: Al rod 99.9999% pure.

1. Uncleaned sample immersed in above solution. Reaction does take place; however, not very efficient.
2. Rod cleaned (wire wheel); immersed. Much more efficient deposit.
3. Rod cleaned (wire wheel); immersed in twenty-five (25%) HCl; rinsed with H$_2$O. Rod immersed in plating solution and produced a much more efficient deposit.

Note: After deposit on sample, it should be rinsed with H$_2$O and left to dry on its own.

EXAMPLE XXX

Tool Joint Samples:
Surface preparation:
Samples had been Cu plated; Reed removed the Cu.
Threads degreased with solvent (Gumout).
Some residue still present.
Samples treated in HCl, both twenty-five percent (25%), for twenty (20) minutes; removed.
Samples placed in plating bath (ambient condition) 3 V., 4 amps. (20 minute duration.)
Samples plated; however, some areas spotty.
Surface to be plated was not clean enough. Surface preparation critical.
Samples buffed (wire wheel); then acidized fifty percent (50%) HCl solution for twenty (20) minutes; then rinsed. Surface appears cleaner.
Samples placed in plating bath (ambient condition) 3 V., 4 amps.—duration ten (10) minutes.
Anode—H.P. Zn 1.5 inch diameter.
Cathode—tool joint N 338.
Samples (pin) buffed with wire wheel; then acidized. 506 HCl (20 minutes); rinsed.
Samples plated (ambient condition) 3 V., 4 amps.
Duration time: ten (10) minutes.
Three (3) anodes used H.P. Zn plates 3 inches wide, 0.5 inches thick, 6 inches long.

EXAMPLE XXXI

Figure 4:
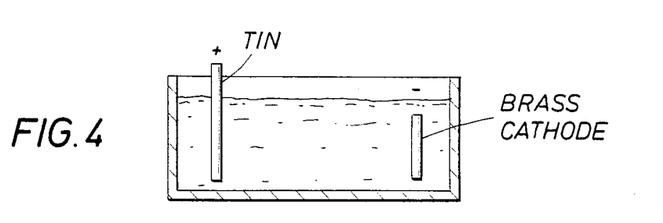

Si Sn Plating:
Solutions used:
100 ml. Si solution
100 ml. H$_2$O
100 ml. Sn solution
Substrate: Brass plate
Preparation of substrate:
Brass cleaned with brass cleaner
Sn anode
Brass cathode
   Duration of electrolysis: one (1) minute. See FIG. 4.
   One (1) amp. at approximately three (3) volts.

EXAMPLE XXXII

Figure 5:
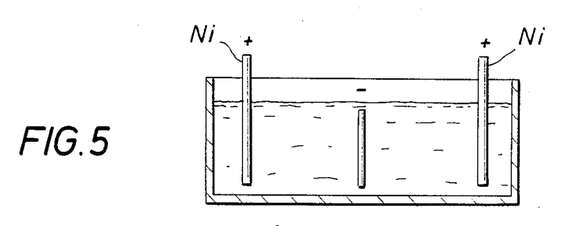
Figure 6:
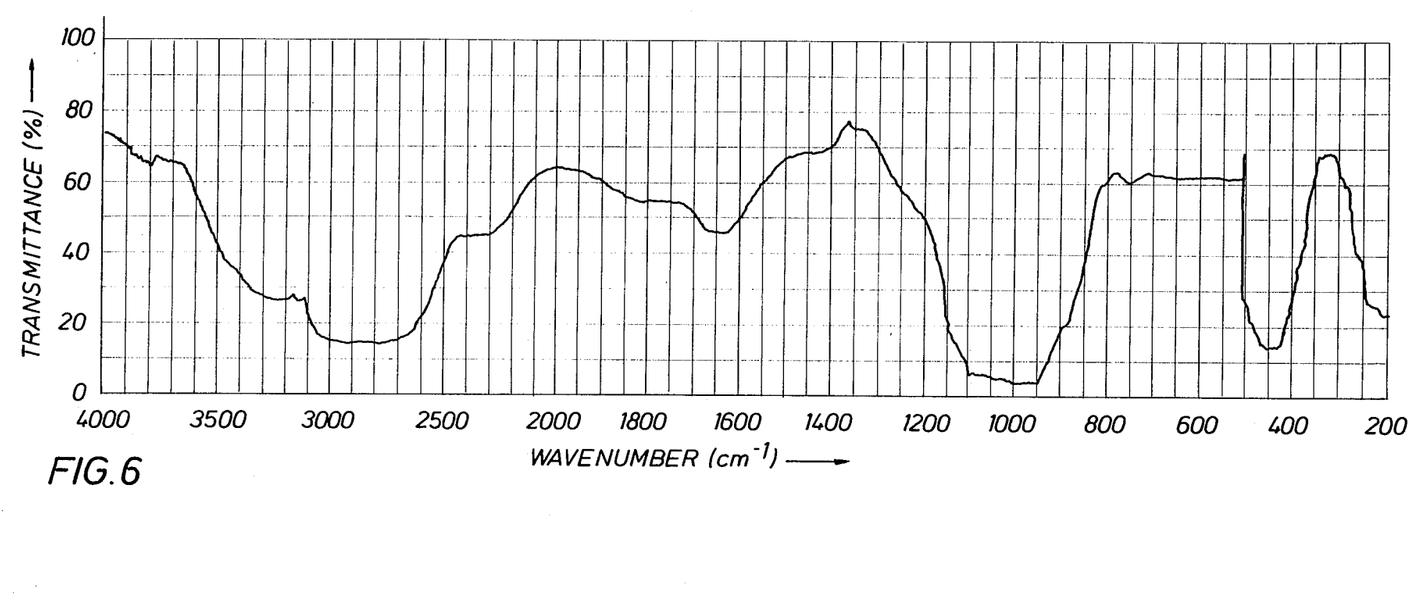
FIGS. 6-8 are graphs depicting various results obtained under the concepts of the present invention.

Ni Electroplating:
Solutions used:
Ni solution
200 ml.
200 ml. H$_2$O
Substrate: Steel
   Substrate cleaned in twenty-five percent (25%) solution for fifteen (15) minutes; rinsed.
   Two (2) Ni anodes used for better coverage on substrate. Duration one-half (0.5) hour. See FIG. 5.
   One (1) amp. at five (5) volts.

EXAMPLE XXXIII

"Zinc Silicide" Coatings on Couplings and Threads:
   The following is field testing of a process for coupling coatings.
   The plating is "Zinc Silicide." General references will be made to a zinc and silicon compound applied through an electrolyte process to the pin and to the couplings.
   The cost is competitive with other zinc coatings and in line with nickel manganese phosphating with a zinc top coat used in coupling manufacturing.
   The tests determined the efficacy of the coatings on four (4) couplings with pipe dope and without pipe dope on A.P.I. L-80 couplings 2-⅜" O.D. and 2-⅞" O.D.

Metal Chemistry
Carbon 0.40 Max.
Manganese 0.19 Max.
Nickel 0.25 Max.
Quenched and tempered material
Rockwell C. Hardness 18–24 R.C.

Test No. 1—Materials were coated on couplings only and doped, with regular A.P.I. pipe dope to 800 lbs. torque and standard A.P.I. stand off. The coupling showed no galling apparent on pin or coupling.
   This operation was repeated eight (8) times with the same results.
   Test No. 2—2-⅞" coated coupling, uncoated pin—no dope—machine crimped back side of coupling onto pipe through personnel error—no results.
   Test No. 3—2-⅜" L-80 coated coupling, coated pin—doped—bucked on and off L-80 four (4) times. No apparent galling or damage to threads.
   Test No. 4—2-⅞" L-80 coated coupling, coated pin—undoped—bucked on and off one (1) time with no apparent galling. Coupling overtorqued on second run resulting in severe galling.
   A fifth test was run using an 8' pup joint of L-80 2-⅜" tubing upset and threaded on both ends. The pins were coated and an L-80 coupling coated. The coupling was bucked on and hydrotested to 10,000 psi. The coupling was removed with no apparent galling. The coupling was bucked on two (2) more times and hydrotested to 10,000 psi. with no leakage. The coupling was removed with no apparent galling to the threads.
   The coatings had a thinness of one-tenth (1/10th) of a micron allowing for use on tight tolerance connections.

EXAMPLE XXXIV

Five (5) samples coated with a corrosion protection surface treatment were evaluated. The samples were 1-⅛" diameter×8" long ASTM A-193 B7 stud bolts with ASTM A-194 grade 2H nuts. The bolts were coated with zinc silicon material in a low temperature electrolytic process. This coating is a replacement for zinc plating, cadmium plating and hot dip galvanizing. Cadmium plating, zinc plating and galvanizing have been used to protect ferrous materials in mild to moderately corrosive environments with varied success. The protective mechanism of such platings and coatings is the ability to sacrifice by oxidizing rather than the ferrous parts coated. This phenomenon, however, leads to problems with appearance and ease of removal after service and in long-term use, a deterioration in the strength of the fastener. The zinc silicon coating relies not on the sacrifice of the coating but as as a barrier to inhibit fastener corrosion.

Zinc silicon has a dull gray appearance after coating. Under low power (20×) magnification the zinc silicon appears to be a continuous amorphous coating. Under higher power (500×) magnification zinc silicon resembles a phosphated surface. Coating thickness is approximately 0.0003 inches thick.

Chemical analysis by Energy Dispersive Spectral X-ray techniques revealed a composite surface of zinc, silicon, and iron (See Table 1). This differs from cadmium, zinc platings, and galvanized coatings in that they have surfaces composed almost entirely of cadmium or zinc.

The bolts were torqued to one hundred percent (100%) of minimum yield strength in a simulated flange fixture incorporating a strain gaged load cell for load monitoring. Torque values were increased incrementally until the yield load was achieved. The bolts were examined after testing to evaluate coating damage.

After mechanical testing the five bolts were placed in an ASTM B-117 salt fog test chamber. Duration of the tests were as follows: two bolts removed after 300 hours; one bolt removed after 700 hours; one bolt removed after 1000 hours; final bolt removed after 1350 hours.

The zinc silicon surface exhibited a coating similar to a phosphated surface. Zinc silicon can retain oil for secondary corrosion protection or paint adherence. The zinc silicon surface is different from a plated surface. Bonding top coats to plated surfaces has been done by reacting a zinc phosphate over the plating. Use of zinc silicon eliminates the need for secondary operations prior to painting.

The presence of iron in the coating chemical analysis indicates that a chemical reaction occurs between the steel substrate and the zinc silicon. This is not the case with an imposed plating. Therefore, the interfacial bond with zinc silicon will be much stronger than with plating.

Zinc silicon provided adequate lubrication during assembly to allow the bolts to be torqued to one hundred percent (100%) minimum yield strength without failure of the bolt or coating. Torque versus load relationships were more linear and reproducible than bolts plated with cadmium and zinc. Galling typically encountered with bolt platings did not occur with zinc silicon. Zinc plated bolts in sizes 1-⅛" diameter and larger cannot be torqued to one hundred percent (100%) minimum specified yield strength without torsional failure due to galling. No such problems were encountered with zinc silicon. The ability to perform without galling at these high percentages of yield strength is an advantage of zinc silicon among conventional plating systems.

Results of the salt fog tests are as follows:

1. Two (2) bolts removed after 300 hours. Nuts turned freely by hand along the entire length of the bolt. No visible corrosion products.

2. bolt removed after 700 hours. Nuts turned freely by hand along the entire length of the bolt. No visible corrosion products.

3. Bolt removed after 1000 hours. Nuts previously had a prevailing break-out torque on the order of 20 to 35 ft. lbs. After starting, the bolt could be turned easily by hand. Slight surface corrosion was present, however, there was no pitting of the steel substrate.

4. Last bolt removed after 1350 hours. The bolt threads were filled with said residue and/or corrosion products. The nut was easily removed from the bolt. The nut could not be threaded on the other areas of the bolt which were not protected by the nut during testing. In an effort to determine the extent of corrosion, the residue was removed with a solution of inhibited hydrochloric acid. The residue was easily removed. There was no gross deterioration of the fastener. There was, however, some minor corrosion pitting. The strength of the fastener was not reduced.

The zinc silicon coating did not sacrifice itself by oxidation as cadmium or zinc platings. The intermetallic compound formed by the zinc-silicon-iron is an effective passivation for steel substrates.

The silicon zinc material, although an electrolytic low temperature process, resembles a high temperature (180°–205° F.) phosphate chemical reaction. The zinc silicon coating will accept oils or paint for increased protection.

Zinc silicon will accommodate the required elongation and durability for fastener applications.

Zinc silicon exhibits a coefficient of friction much lower than zinc platings and approximately equivalent to cadmium plating.

Zinc silicon passivates surfaces rather than sacrificing in corrosive environments.

Zinc silicon combines the application techniques of platings with the passivation and properties of phosphate coatings.

Figure 7:
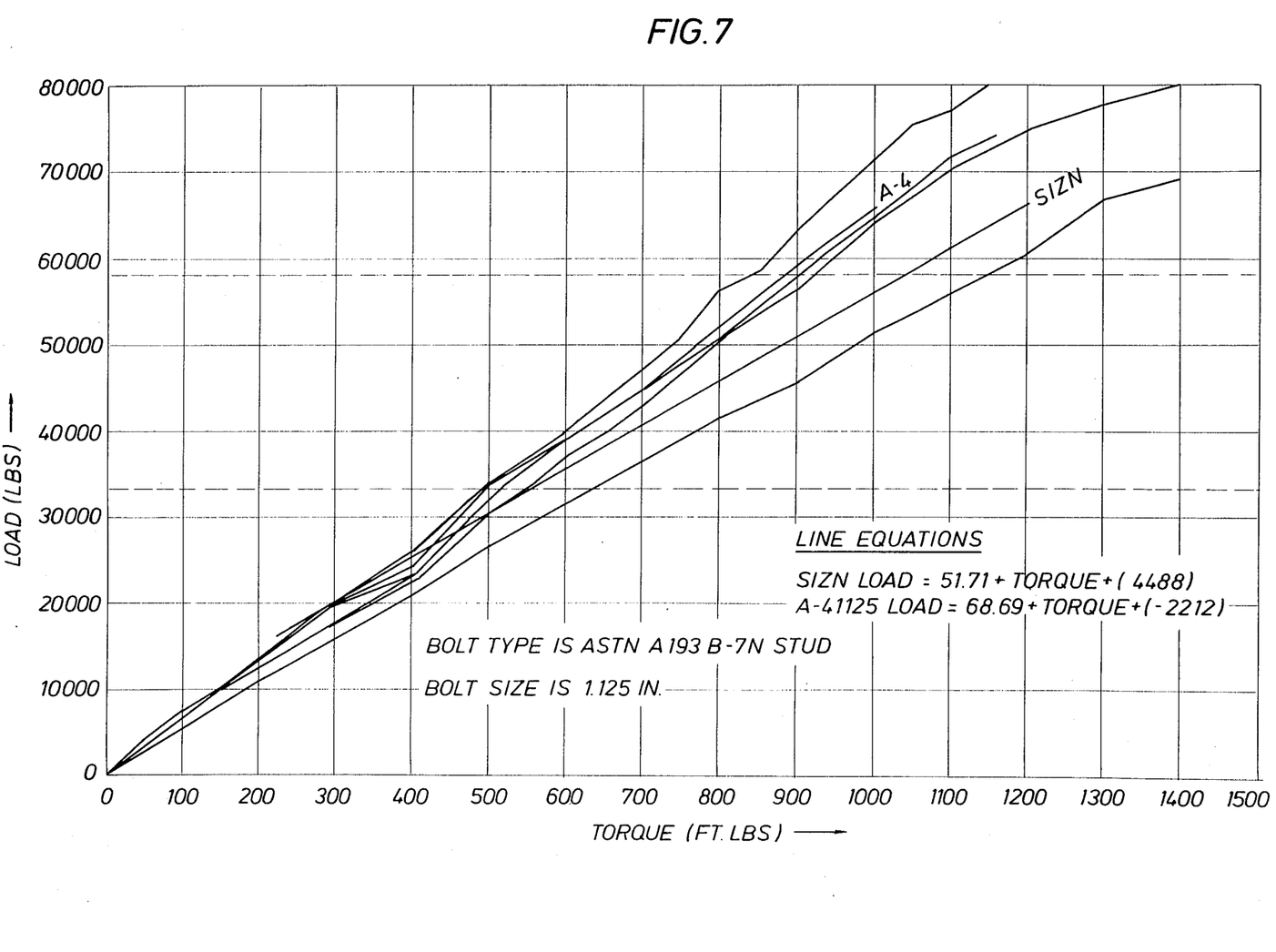

The results of the above tests will be seen in Tables I and II, and in FIG. 7.

TABLE I

| SPECTRUM STAN SIZN STANDARDLESS EDS ANALYSIS (ZAF CORRECTIONS VIA MAGIC V) | | | | | |
|---|---|---|---|---|---|
| ELEMENT & LINE | WEIGHT PERCENT | ATOMIC PERCENT | PRECISION 2 SIGMA | K-RATIO | ITER |
| SI KA | 6.94 | 14.73 | 0.36 | 0.0190 | |
| FE KA | 2.97 | 3.17 | 0.25 | 0.0365 | |
| ZN KA | 90.09 | 82.10 | 1.26 | 0.9446 | 5 |
| TOTAL: 100.00 | | | | | |

TABLE II

| COATING EVALUATION DATA | | | | | | | | |
|---|---|---|---|---|---|---|---|---|
| BOLT SIZE .1250 | COATING TYPE SIZN | | | TORQUE TOOL TW-1 | LOAD CELL 3500-100K | | | 100% Y.S. 83000 STD. |
| Torque | Bolt 1 | Bolt 2 | Bolt 3 | Bolt 4 | Bolt 5 | MEAN | VARIANCE | DEV. |
| 300 | 19.3 | 17.9 | 17.0 | 16.8 | 20.3 | 18.260 | 18.184 | 1.508 |
| 400 | 25.9 | 24.6 | 0.0 | 21.8 | 27.4 | 24.925 | 42.369 | 2.377 |
| 500 | 31.6 | 30.0 | 28.9 | 27.6 | 33.7 | 30.360 | 45.144 | 2.375 |
| 600 | 39.2 | 35.9 | 33.1 | 32.3 | 38.5 | 35.800 | 76.800 | 3.098 |
| 700 | 45.9 | 41.0 | 38.8 | 37.4 | 43.6 | 41.340 | 95.984 | 3.464 |
| 800 | 51.7 | 0.0 | 43.4 | 42.1 | 51.6 | 47.175 | 197.969 | 5.138 |
| 900 | 57.4 | 52.7 | 47.7 | 46.2 | 0.0 | 51.000 | 194.450 | 5.092 |
| 1000 | 64.7 | 56.9 | 51.8 | 0.0 | 0.0 | 57.800 | 281.400 | 6.497 |

TABLE II-continued

COATING EVALUATION DATA

| BOLT SIZE .1250 | COATING TYPE SIZN | | | TORQUE TOOL TW-1 | LOAD CELL 3500-100K | | | 100% Y.S. 83000 STD. |
|---|---|---|---|---|---|---|---|---|
| Torque | Bolt 1 | Bolt 2 | Bolt 3 | Bolt 4 | Bolt 5 | MEAN | VARIANCE | DEV. |
| 1100 | 70.3 | 63.5 | 58.8 | 56.1 | 0.0 | 62.175 | 290.169 | 6.220 |
| 1200 | 74.8 | 69.3 | 64.3 | 60.9 | 0.0 | 67.325 | 275.519 | 6.061 |
| 1300 | 77.7 | 72.3 | 68.0 | 66.5 | 0.0 | 71.125 | 109.419 | 5.026 |
| 1400 | 0.0 | 80.5 | 69.5 | 70.4 | 0.0 | 73.467 | 248.689 | 6.108 |

EXAMPLE XXXV

The extreme pressure properties of test pieces that had been coated electrolytically were examined.

The test pieces were coated electrolytically and run on a Timken extreme pressure tester using lubricating oil.

The definitions used in this test are as follows:

Load Carrying Capacity of a Lubricant is the maximum load or pressure which can be sustained without failure of moving bearings or sliding contact surfaces as evidenced by seizure or welding.

Seizure or Welding is the localized fusion of metal between rubbing surfaces of the test pieces. Seizure is indicated by streaks appearing on the surface of the test piece, an increase in friction or wear and vibrations.

Scoring occurs when the lubricant film is substantially maintained and a smooth scar is observed. When there is a breakdown of the film, scoring of the test block occurs. In its most recognized form, it is characterized by the furrowed appearance of a wide scar and by excessive metal pickup.

Wear is removal of metal from the test piece by the mechanical action of the apparatus.

O.K. Value is maximum weight, in pounds, added to the load lever weight pan, at which no scoring or seizure occurs.

Score Value is minimum weight, in pounds, added to the load lever weight pan, at which scoring or seizure occurs.

The test block was observed after each run to see if scoring had occurred, when it is observed, it is recorded as the score value. The O.K. value is taken as the reading immediately before the score value.

Three test pieces were run on the Timken tester and were identified as follows:

No. 1—Uncoated ring and block.
No. 2—Coated ring—uncoated block.
No. 3—Coated ring and block.

The loss of weight of the block in milligrams was plotted against the torque meter reading, giving a visual indication of the rate of wear, score value and O.K. value. See FIG. 8.

Figure 8:
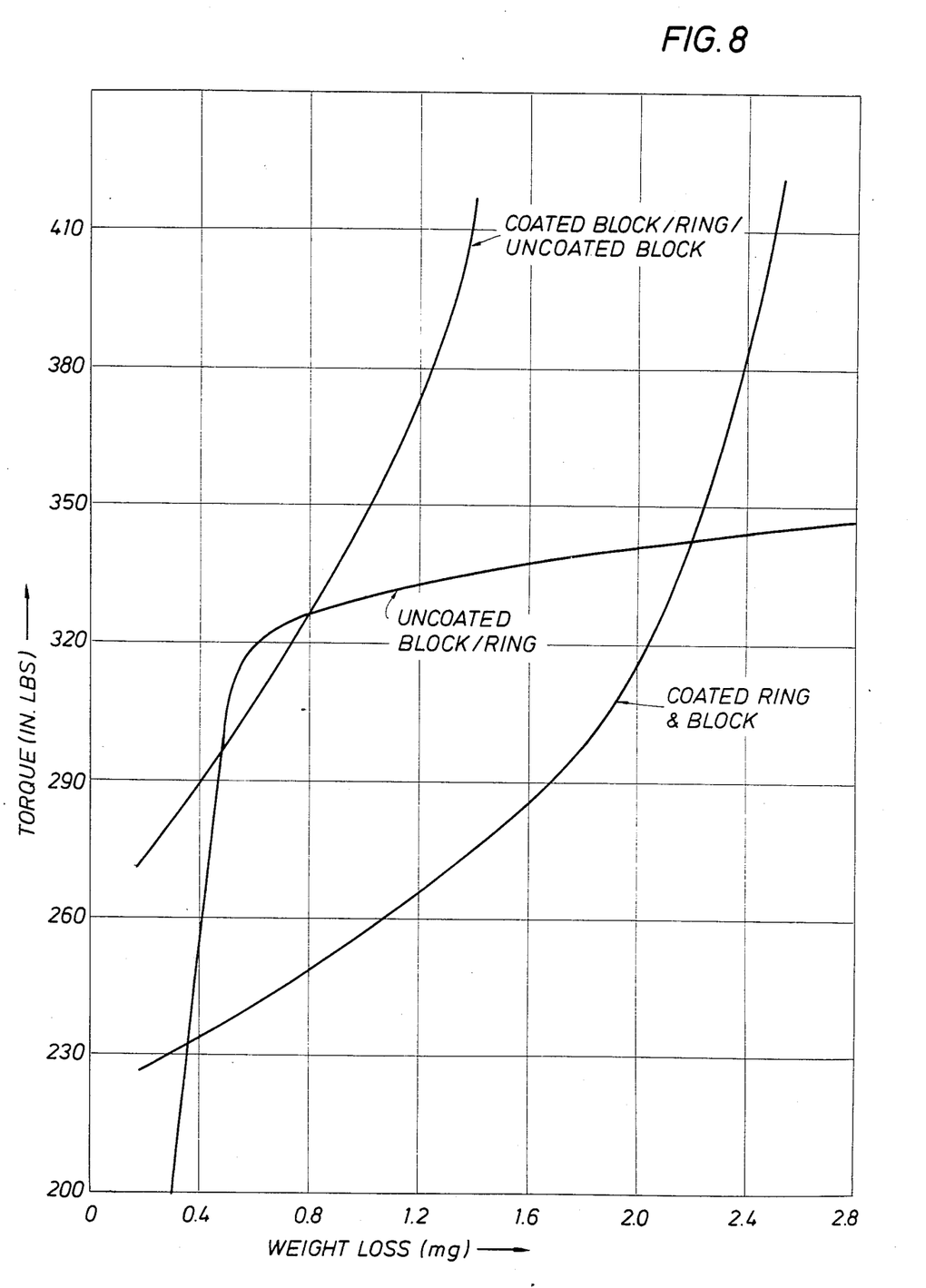

Examination of the curves show that the score value was 350 in.-lbs. and the O.K. value was 320 in.-lbs. for the uncoated ring and block. The coated ring and uncoated block gave a steady rate of wear and did not score or seize at the maximum torque of the instrument. The coated ring and coated block also gave a steady wear rate but at a higher rate. There was some evidence of scoring at the maximum torque of 410 in.-lbs.

Figure 9:
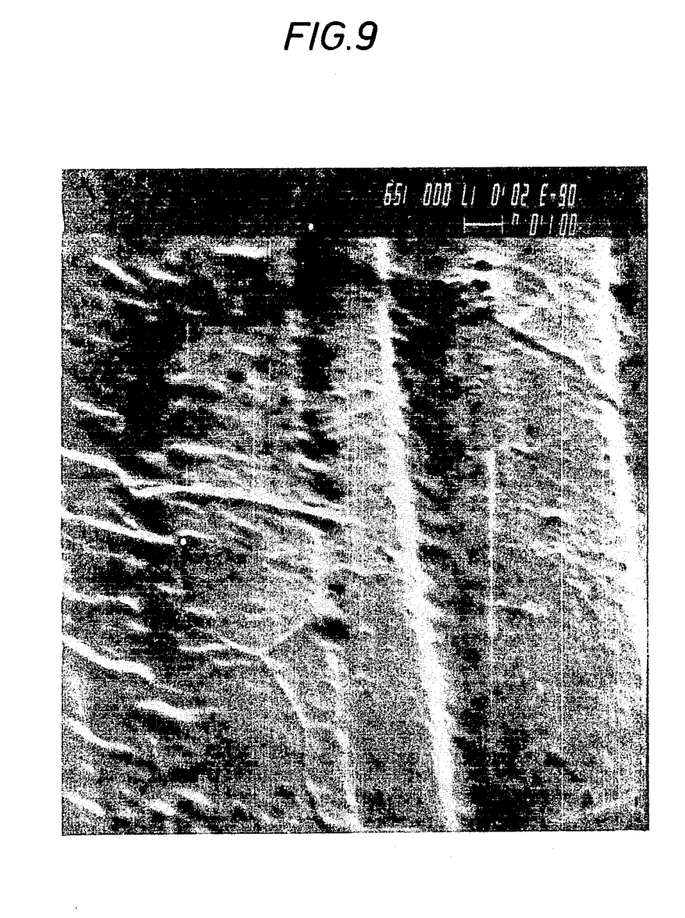
FIGS. 9-20 are various micrographs, pictures, and charts, verifying the presence of substances plated according to the present invention.
Figure 10:
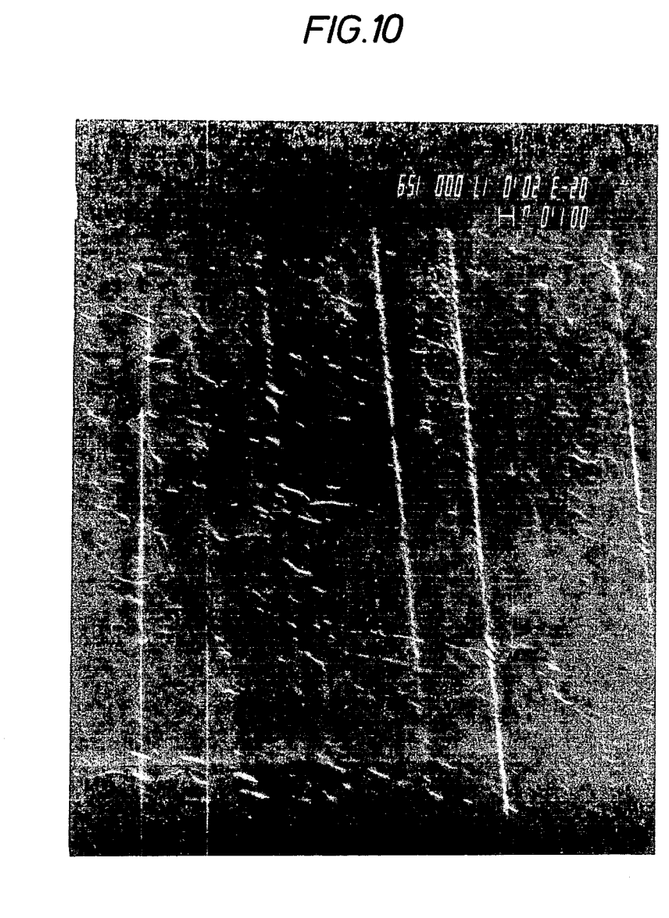
Figure 11:
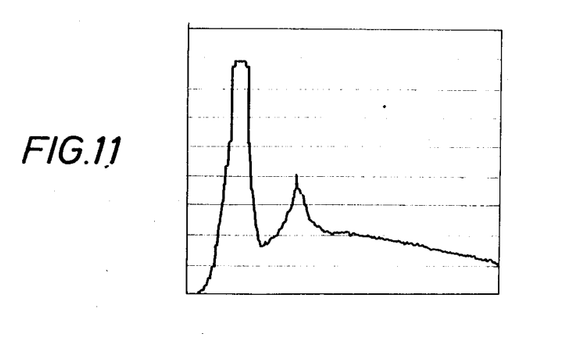
Figure 12:
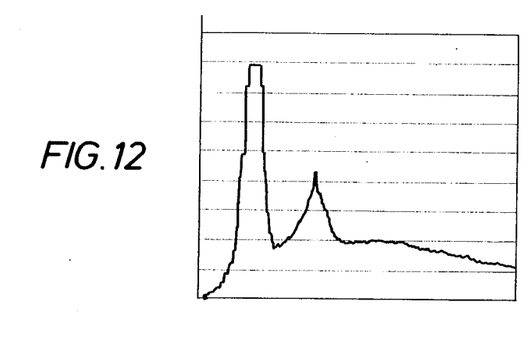

FIGS. 9 and 10 are micrographs of a silicon deposition on a copper substrate. The lines running vertically are work marks on the substrate. The other lines are fractures and crystal boundaries. FIGS. 11 and 12 are pictures of the micrographs in FIGS. 9 and 10, showing a thin film electrodeposition of high purity silicon on a copper substrate. FIGS. 11 and 12 confirm the presence of silicon and indicate some zinc in the copper substrate.

Figure 13:
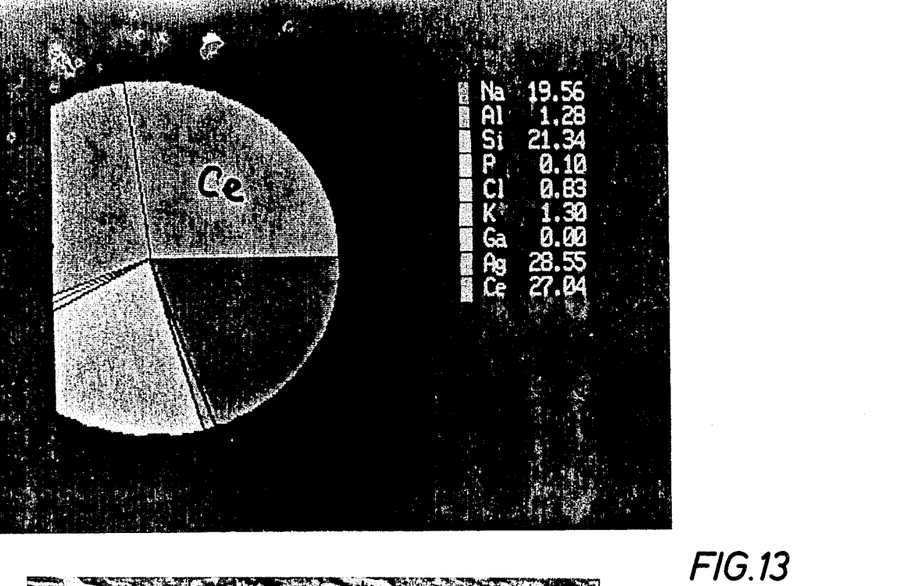
Figure 14:
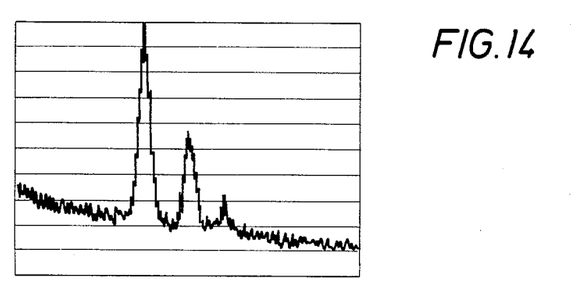
Figure 15:
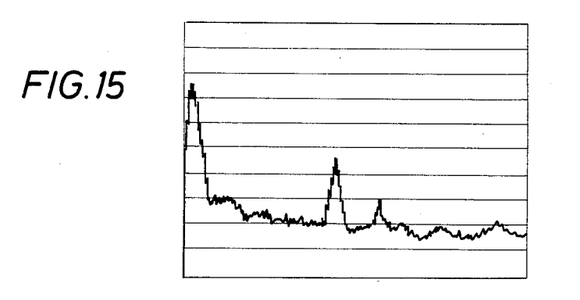
Figure 16:
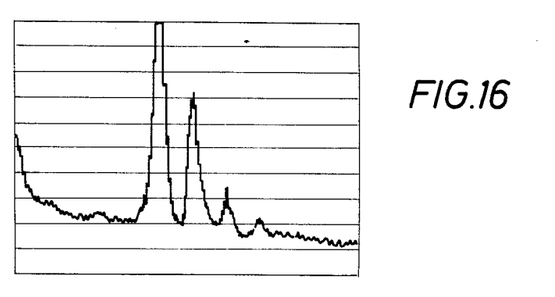
Figure 17:
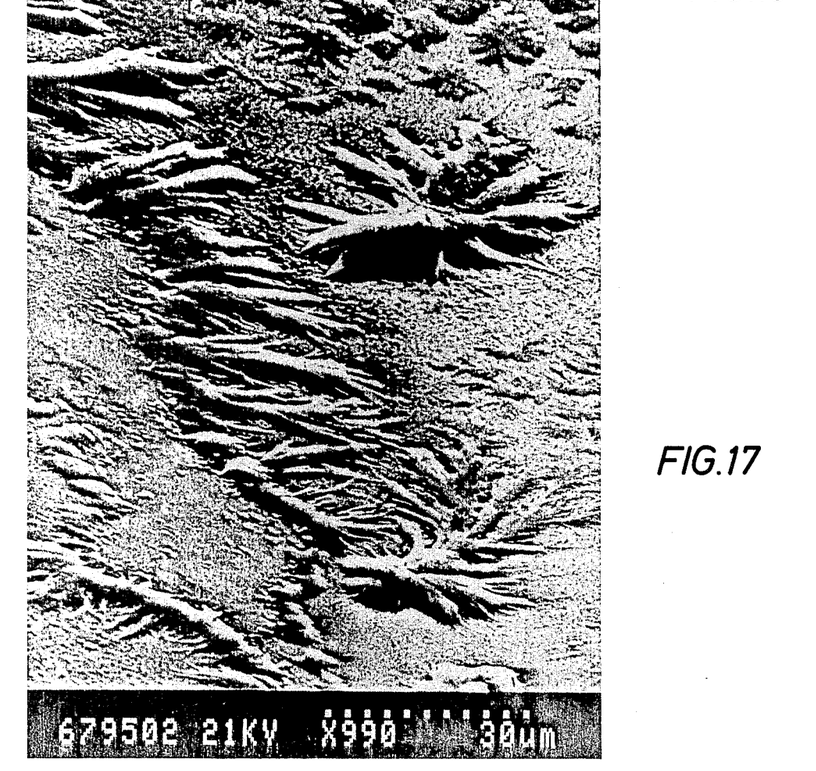
Figure 18:
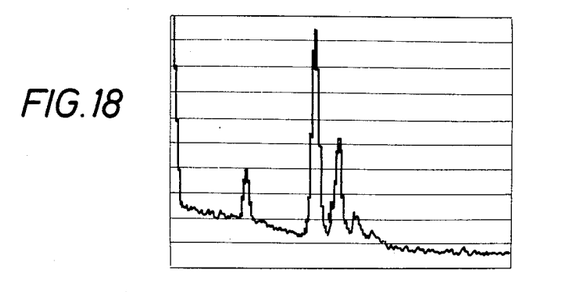

FIGS. 14–16 and 18 are micrographs which confirm the presence of cerium. It is noted that cerium dioxide is a safe substitute for radioactive heavy metals used in testing the disposal of nuclear waste. A surface in which cerium dioxide has been chemically bound is shown in FIG. 17, and the presence of cerium in confirmed at 27.04% in the chart of FIG. 13.

Figure 19:
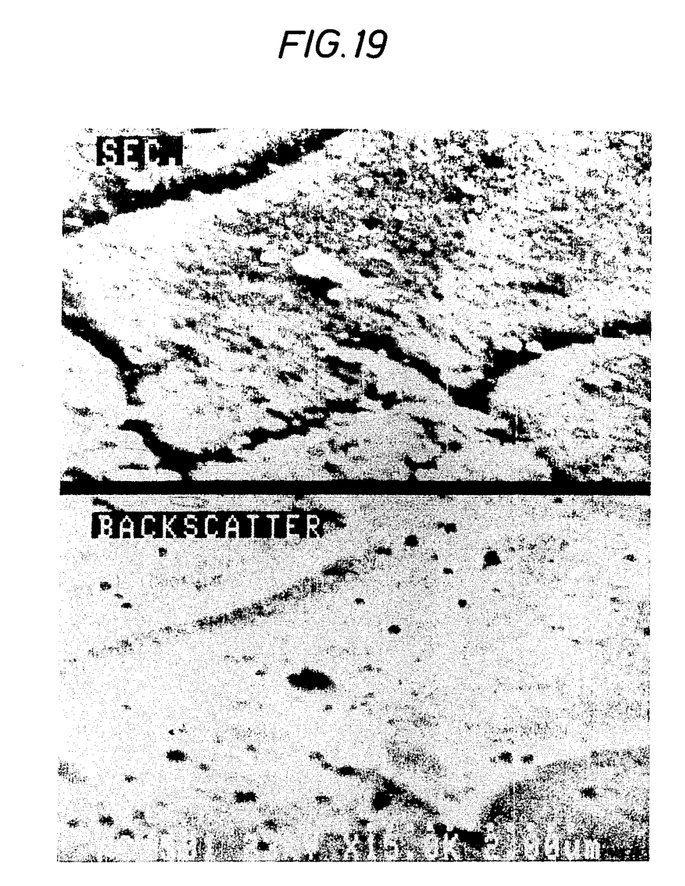
Figure 20:
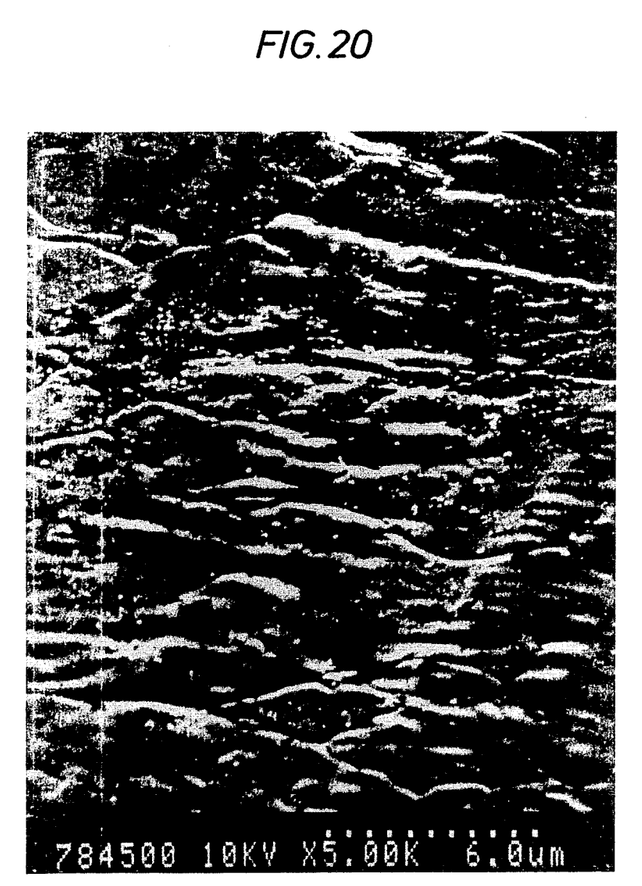

Further micrographs of thin film silicon electrodeposition will be seen in FIGS. 19 and 20.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed as new and desired to be secured by Letters Patent of the United States is:

1. A metal compound formed by combining a metal selected from the group consisting of silicon, aluminum, beryllium, titanium, zinc, and tin, with an alkali metal hydroxide, and water, in the ratio by mole percent as follows:

| | Metal | Alkali Metal Hydroxide | $H_2O$ |
|---|---|---|---|
| Silicon | 6 | 1 | 10 |
| Aluminum | 2 | 1 | 8 |
| Beryllium | 2 | 1 | 6 |
| Titanium | 5 | 1 | 10 |
| Zinc | 1 | 1 | 6 |
| Tin | 5 | 1 | 10. |

2. A method of preparing a silicon compound comprising providing silicon, sodium hydroxide, and water in the ratio of 6:1:10 by mole percent, combining silicon and water, adding said sodium hydroxide gradually to prevent excessive heating and allowing the reaction to go to completion.

3. A process according to claim 2 wherein the step of providing silicon comprises providing high purity silicon chunks 1.5" to 2" in diameter, the step of adding sodium hydroxide comprises adding sodium hydroxide incrementally over a period of one hour and further comprises the step of cooling during addition of the sodium hydroxide.

4. The process according to claim 2 wherein the step of providing silicon comprises adding low purity silicon having a purity in the range of approximately 95-98 percent.

* * * * *